Feb. 14, 1950     C. S. McCHESNEY     2,497,461
APPARATUS FOR SPLICING INNER TUBES OF TIRES

Filed April 19, 1949     5 Sheets-Sheet 1

INVENTOR.
CUYLER S. MCCHESNEY
BY
Benj. T. Rauber
ATTORNEY

Feb. 14, 1950     C. S. McCHESNEY     2,497,461
APPARATUS FOR SPLICING INNER TUBES OF TIRES
Filed April 19, 1949     5 Sheets-Sheet 3

INVENTOR.
CUYLER S. McCHESNEY
BY Benj. T. Rauber
ATTORNEY

Feb. 14, 1950     C. S. McCHESNEY     2,497,461
APPARATUS FOR SPLICING INNER TUBES OF TIRES
Filed April 19, 1949     5 Sheets-Sheet 4
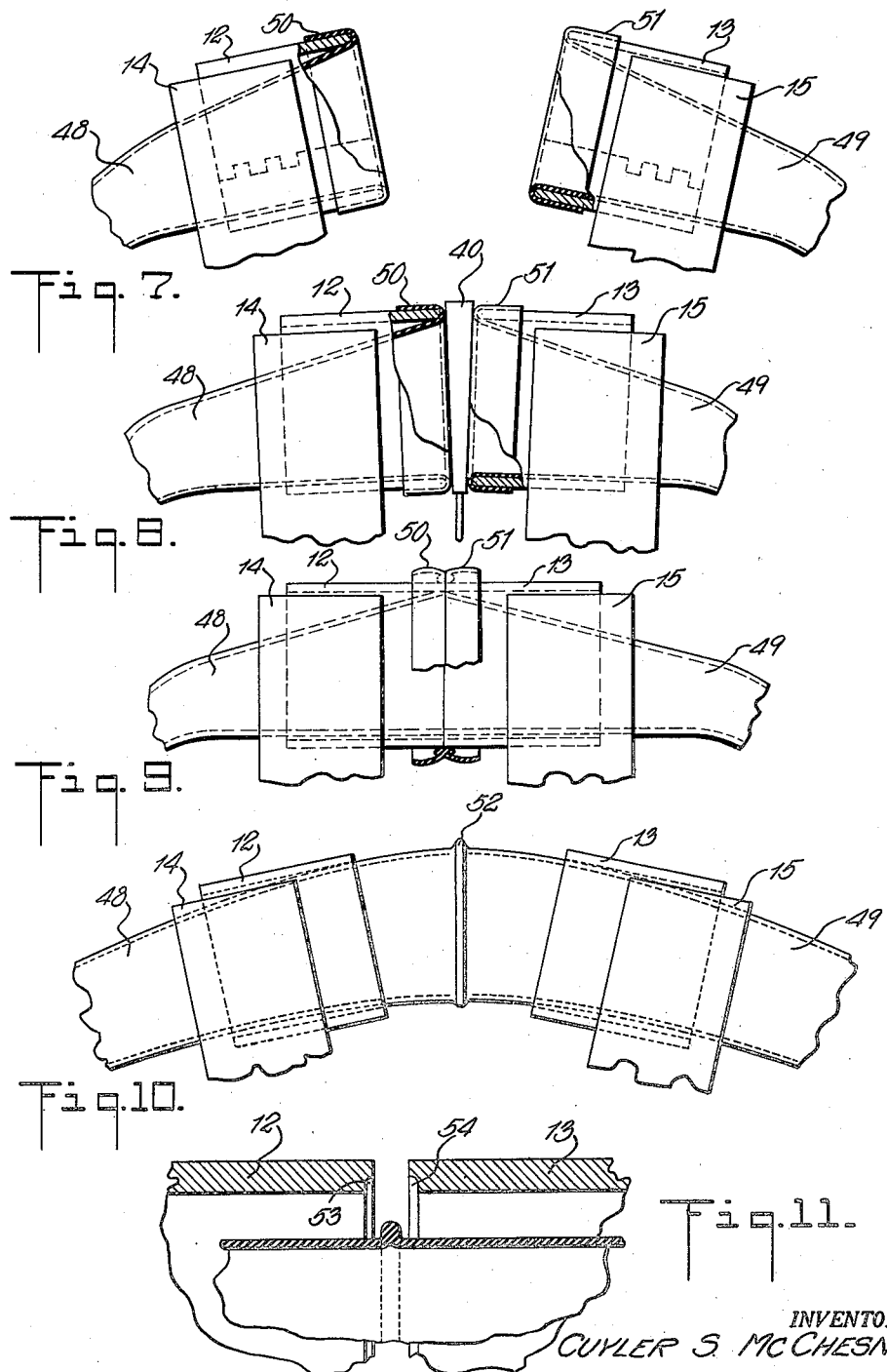
INVENTOR.
CUYLER S. McCHESNEY
BY
Benj. T. Rauber
ATTORNEY Feb. 14, 1950   C. S. McCHESNEY   2,497,461
APPARATUS FOR SPLICING INNER TUBES OF TIRES Filed April 19, 1949   5 Sheets-Sheet 5

INVENTOR.
CUYLER S. McCHESNEY
BY
Benj. T. Rauber
ATTORNEY

Patented Feb. 14, 1950

2,497,461

UNITED STATES PATENT OFFICE 2,497,461

APPARATUS FOR SPLICING INNER TUBES OF TIRES

Cuyler S. McChesney, Kenmore, N. Y., assignor to Dunlop Tire and Rubber Corporation, Buffalo, N. Y., a corporation of New York Application April 19, 1949, Serial No. 88,352

9 Claims. (Cl. 154—9)

My present invention relates to a method and apparatus for splicing inner tubes of tires before final curing.

In manufacturing inner tubes and tube stock, a rubber or synthetic rubber compound is extruded into a thin gauge tube which is run onto a flat belt on which the tube assumes a flat form. When tubes are measured for width on the belt, this dimension is commonly termed a "flat width." The tubes are then cut to a length somewhat greater than the circumference of the tire tube and are either sent to the tube splicer or placed on storage trays or other storage equipment where they are kept until they are to be spliced. During the storage period the uncured tube stock tends to shrink in length. The area of the tube in contact with the tray at the midpart of the tube does not shrink as rapidly as does the stock at the ends of the length of tube and, therefore, the tube stock has a tendency to bell or increase in flat width at the ends. This increase in width is not always uniform and one end may be at a different flat width than the other.

Heretofore to eliminate the non-uniform ends of the tube stock it has been found desirable to recut the tubes to length removing a sufficient amount of the tube at either end to a point at both ends of the same flat width.

Moreover, in apparatus as heretofore used it has been difficult to keep the apparatus in adjustment and maintenance to handle variations in guage, flat width and bell ends and to prevent excessive wear from the soap stone required to keep the uncured rubber from sticking together.

In my present invention I provide a method and apparatus whereby the above disadvantages may be obviated, in which the amount of tube stock to be cut from the ends is greatly reduced or eliminated and in which a greater security in splicing is attained.

In my present invention each end of the length of tube stock is placed or inserted in one of a pair of cylindrical dies, a small length of the stock is then turned over to the outer surface in the manner of a cuff, the turned over edges are brought together under pressure in some cases also while heated to join them in a secure splice and to cut off the outer cuff portion. The dies are then separated and the completed inner tube may be removed through a hinged or separable part of periphery of the die. The opposed parts of the dies may be undercut on their inner periphery to form a slight flash and to give a sharp or keen cutting away of the cuff portion.

To enable the completed tube to be removed from the die, the die is of cylindrical shape having a hinged segment and is held in a die holder having an opening or cut away segment similar to that of the die. After the hinged segment is closed it is locked in closed position in the die holder. When the splicing is finished it is rotated to bring the hinged segment into alignment with the open segment of the holder so that the hinge may be swung open and the tube removed.

Each die holder and die is mounted on one arm of a pair of complementary levers which may swing to bring the opposed edges of the dies together, or reversely, to open them. These levers are actuated by a suitable power means, preferably fluid operated means having a toggle action. The action of the fluid pressure actuating means is slowed or retarded during its final closing movement as, for example, by a dash pot or fluid resistance. Mounted in association with the die operating levers is a swinging arm carrying an element which swings between the edges of the die on the first closing movement to heat the turned over edges of the tube stock and then out of position between the dies to permit them to close and splice the ends of the tube.

The various features of the invention are illustrated, by way of example, in the accompanying drawings in which Fig. 1 is an elevation of an apparatus embodying a preferred form of the invention, parts of the apparatus being removed to show operating elements;

Fig. 7 is a view showing the two ends of the tube stock placed in and turned over opposed dies;

Fig. 8 shows the two dies brought together with their edges against a heater element;

Fig. 9 shows the dies in closed position to splice the ends of the tube in abutment;

Fig. 10 shows the spliced tube with the dies separated;

Fig. 11 is a part longitudinal section showing the spliced tube stock and the relation of the dies after separation;

Figure 1:
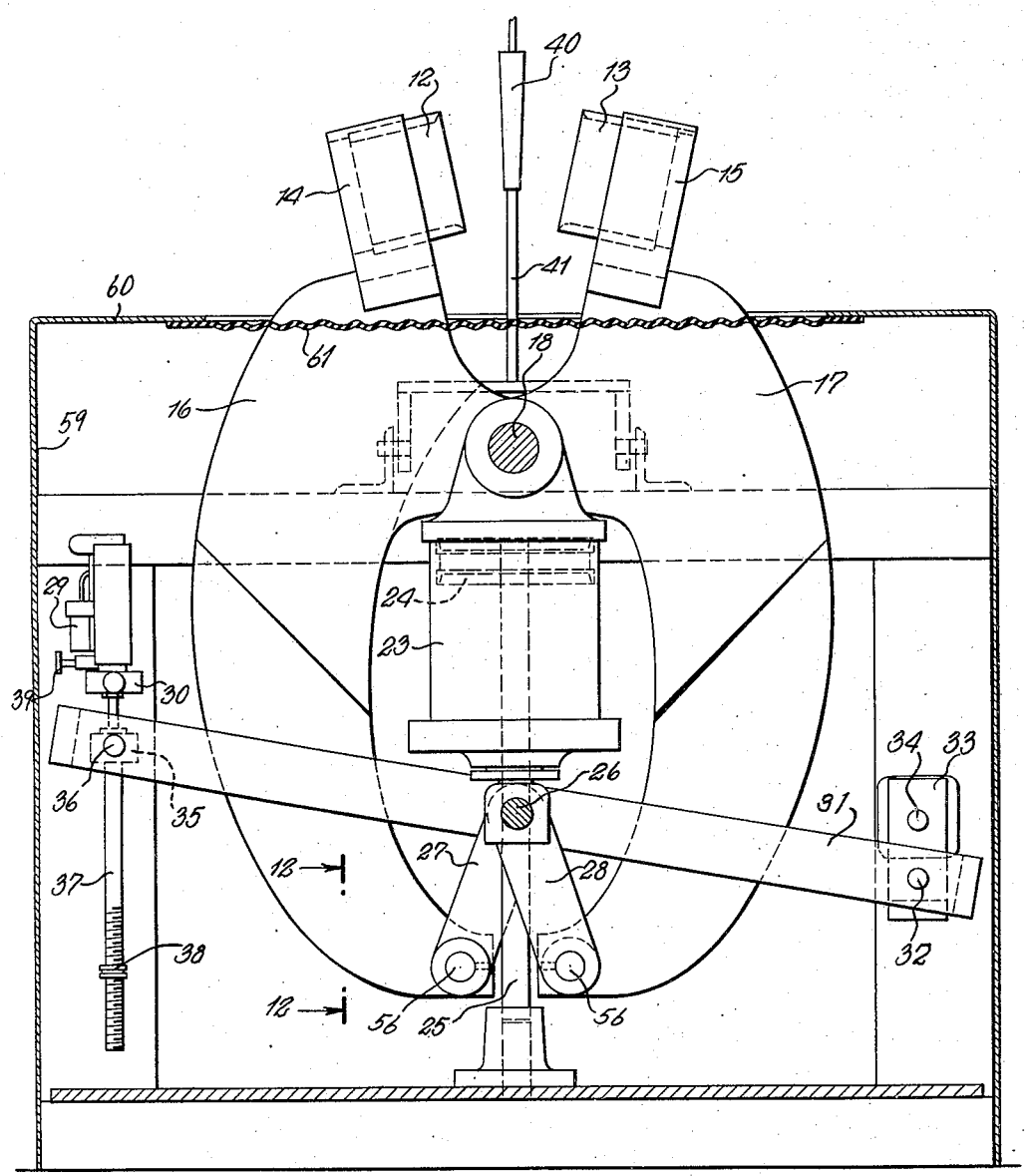
Figure 2:
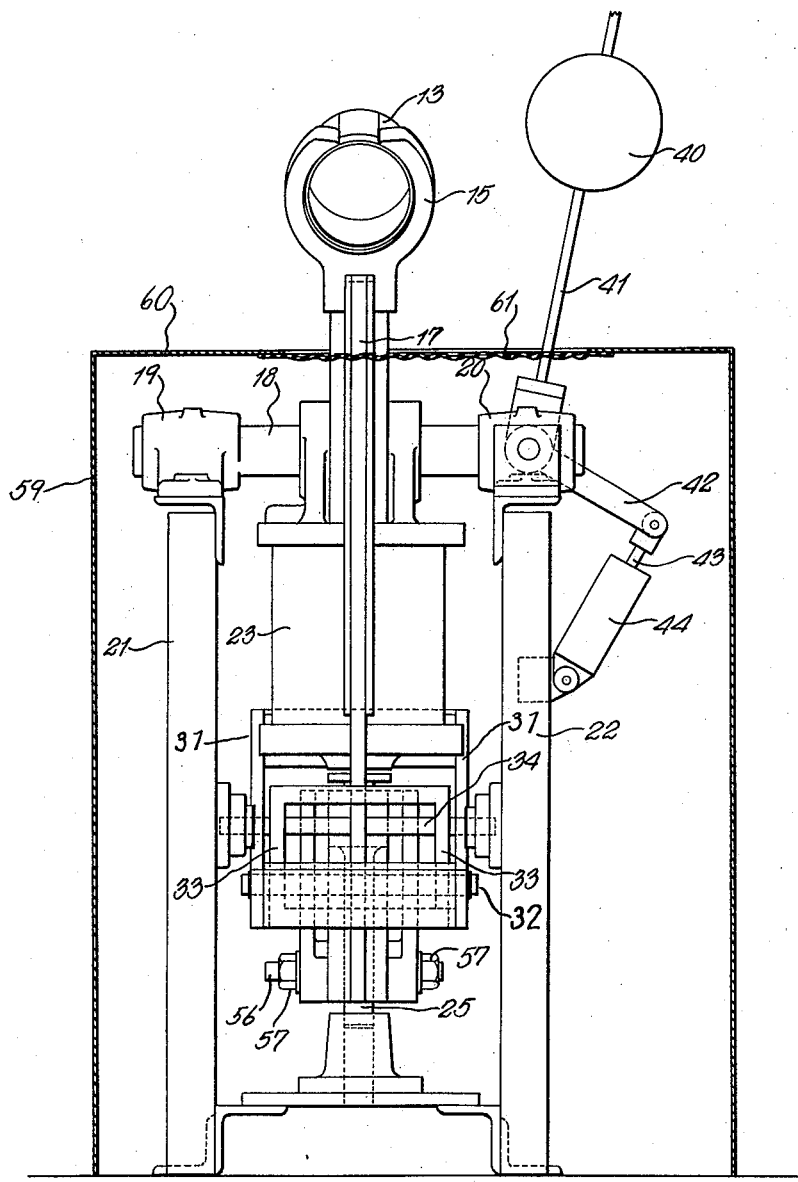
Fig. 2 is a side elevation taken at the right of Fig. 1.
Figure 3:
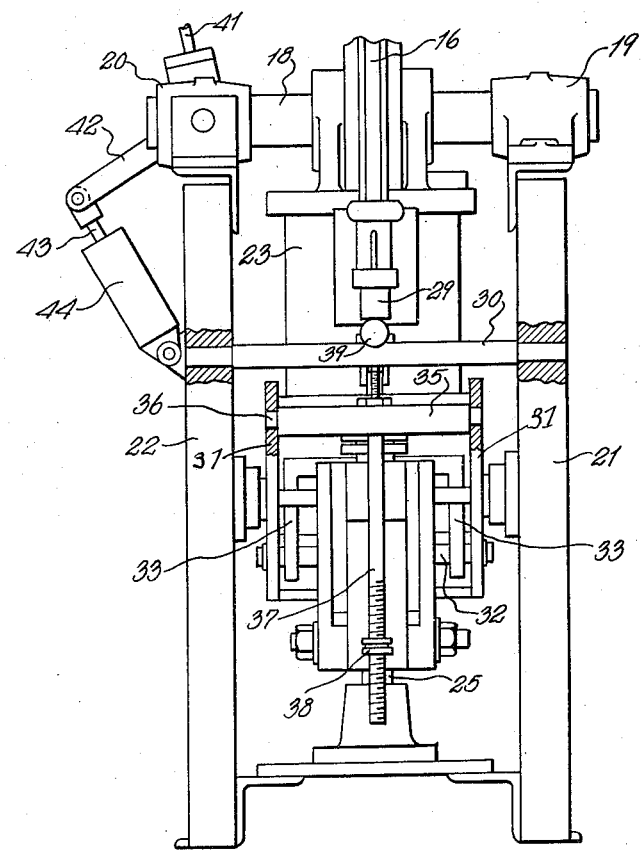
Fig. 3 is an elevation taken at the left of Fig. 1.
Figure 4:
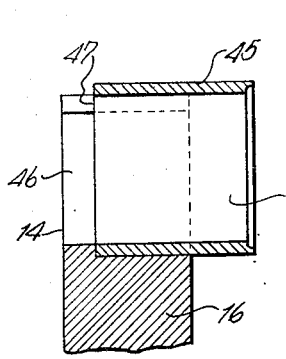
Fig. 4 is a side view of the die and holder elements.

Referring more particularly to Figs. 1 to 3, a pair of cylindrical splicing dies 12 and 13 are mounted in die holders 14 and 15 respectively on the ends of a pair of levers 16 and 17. The levers 16 and 17 are pivoted on a shaft 18 extending between and journalled on bearings 19 and 20 on side frames 21 and 22. Also depending from the shaft 18 is a cylinder 23 having a piston 24 to be operated by pressure fluid, such as air. Extending downwardly from the piston 24 is a stem 25 carrying a cross shaft or trunnion 26 which has a pair of links 27 and 28 to the lower arms of the levers 16 and 17 so that as the piston rod 25 descends the links 27 and 28 separate or move apart the lower arms of the levers and swing the upper arms carrying the dies 12 and 13 toward each other.

As it is desirable to limit the speed of the dies 12 and 13 toward the end of their closing movement, the movement of the piston stem 25 is transmitted through a suitable linkage to a check cylinder 29 mounted on a bar 30 which is supported by trunnions between the side frames 21, 22, to permit the check cylinder to rock. The movement of the piston rod 25 is transmitted to the cylinder 29 by means of a pair of levers 31 (one at each side of the stem) pivotally secured to the shaft 26. One arm of the levers 31 is fulcrumed on a shaft 32 carried by a pair of links 33 which are journalled on a shaft 34 extending between and mounted on the side frames 21 and 22. This permits the fulcrum 32 to shift sidewise and permit the levers 31 to swing about the shaft 26 of the stem 25 without putting a side thrust on the stem.

The opposite arms of the levers carry a bar 35 pivotally mounted on and between the levers by trunnions 36. A piston stem 37 of the check cylinder 29 extends through and is slidable relatively to the rocking bar 35. This permits levers 31 and the piston stem 37 to swing freely and enables the stem 37 to slide relatively to the bar 35 without side thrust or strain. The lower end of the piston stem 37 is threaded to receive a nut 38, the height of which may thereupon be adjusted.

When the piston 24 and stem 25 move downwardly to swing the levers 16 and 17 to splicing position, the levers 31 tilt counterclockwise bringing the bar 35 into contact with the stop nut 38, thereupon further movement is retarded by piston stem 37, the movement of which is in turn restrained by the passage of fluid through a restricted orifice in one end of the cylinder 29 to the other. The resistance of flow of fluid may be controlled by a manually adjustable needle valve 39. Accordingly the levers 16 and 17 may swing rapidly until the end of their movement at which time the links 27 and 28 have a slower movement due to toggle action, and the movement is moreover retarded by the retarding cylinder 29. The point at which this retarding takes place may be regulated by adjusting the stop nut 38.

Figure 12:
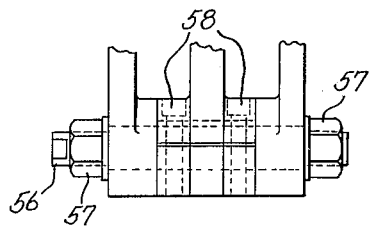
Fig. 12 is a view taken on line 12—12 of Fig. 1 of a part of the apparatus.

It is necessary for the dies to come together very accurately. This requires suitable adjustment which is made through the eccentric pins 56, Fig. 12, which after adjustment are held in proper position by screws 58. The eccentric pins 56 are shouldered and held in position by lock nuts 57.

The main elements of the splicing machine may be enclosed in an enclosure comprising side walls 59 and a top 60 having an opening through which the arms 16 and 17 and 41 may project. This opening may be closed by a resilient flexible sheet, such as a rubber sheet 61, which fits about the arms 16, 17 and 41 while permitting these arms to move through the limited movements required for their operation. This protects the working parts of the machine from being clogged with powdered talc with which the tubes are covered to keep them from sticking.

When a tube is to be spliced the edges that are to be brought into contact are preferably heated and softened. For this purpose the dies 12 and 13 with the tube ends mounted thereon are first brought against a heated element 40 mounted on an arm 41 of a bell crank lever fulcrumed on the side frame 22 and having an arm 42 pivoted to a piston stem 43 of a fluid actuated cylinder and piston 44. Fluid is admitted to the cylinder 44 to force outwardly the piston stem 43 and swing the arms 41 and 42 counterclockwise to bring the heated plate 40 to a position between the dies 12 and 13 before the latter move to closed position. In this way the edges of the tube stock are brought into contact with the heated plate until softened, the dies are then separated, the plate 40 swung out of position between the dies and the dies brought together to splice the ends of the tube stock to a butt splice.

Figure 5:
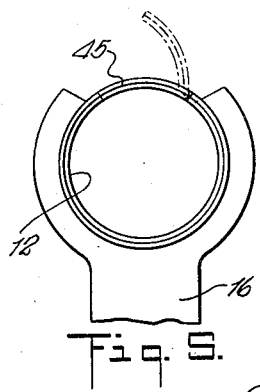
Figs. 5 and 6 are end views of the die and holder showing the die in different positions of rotation, the position of the swinging segment when opened being shown in broken lines in Fig. 1.
Figure 6:
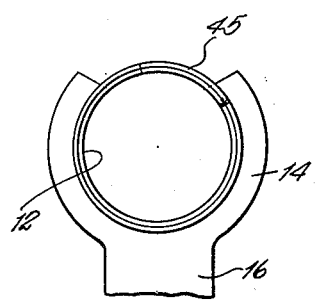

When the ends of the tubes are spliced the tubes are encircled by the cylindrical dies 12 and 13. To enable the completed tube to be removed the dies are opened to permit removal of the tube. For this purpose the dies have a hinged segment 45 which, as shown in Fig. 5, may swing to open position and provide a passage for the removal of the tube stock. The dies are rotatably mounted in a cylindrical opening 46 having a shoulder 47 against which the end of the die 12 rests and which receive the thrust of the dies as they are pressed together to splice the two ends. When the stock has been inserted through the opening 46, or prior to its insertion, the dies 12 are rotated to the position shown in Fig. 6, whereupon the segment 45 is locked in position to close the die. Upon completion of splicing the die is rotated to the position shown in Fig. 5, whereupon the segment 45 may be swung open to permit the removal of the completed tube.

The various steps of the splicing method are shown in Figs. 7 to 11. In these figures the two end portions 48 and 49 of the tube stock are inserted through the dies 12 and 13 respectively and the projecting ends are folded back about the edges of the dies to form cuff portions 50 and 51.

In the next step, as shown in Fig. 8, the dies are swung against the opposite faces of the heater disc 40 and remain in this position until the turned over edges of the stock are heated to a tacky condition, thereupon the dies are separated sufficiently to permit the heater element to be removed and are again brought together under pressure as shown in Fig. 9. This brings the softened edges of the tube stock together under pressure and also serves to cut away or sever the cuff parts at 50 and 51.

When the dies are separated as in Fig. 10 the two ends are spliced as at 52. A circumferential ridge or flash may be formed of any desired dimensions by undercutting the opposed edges of the dies as at 53 and 54. This will insure that a sufficient amount of stock is enclosed between the opposed edges of the dies under pressure and within the cutting of cuff severing parts of the die. After this the dies may be opened, as described above, and the completed tube removed.

Figure 13:
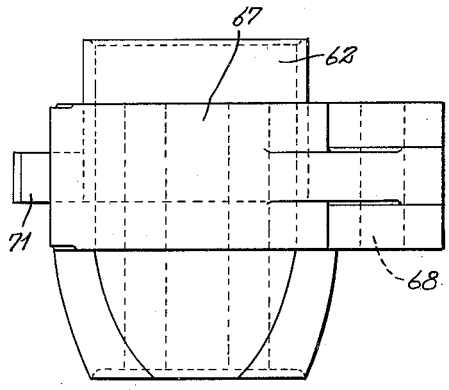
Figs. 13 and 14 and 15 are respectively, plan, side and end views of a modified form of a die-holding element.
Figure 14:
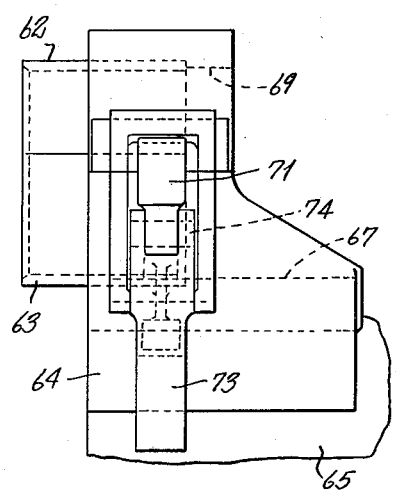
Figure 15:
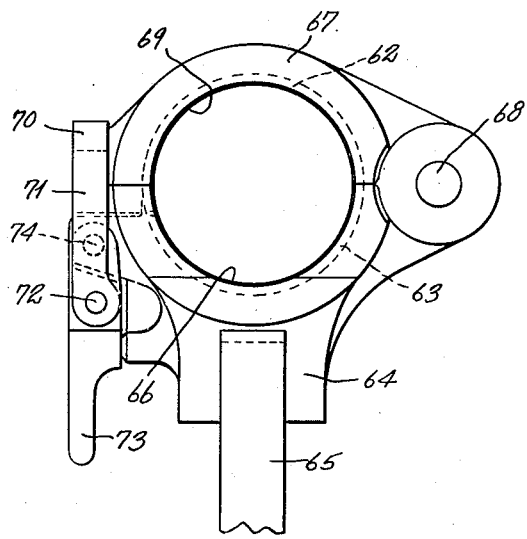

In the modified form of the invention shown in Figs. 13, 14 and 15, a die formed of two parts 62 and 63 is placed in a die holder comprising a base 64 mounted on an arm 65 and having a semi-cylindrical recess 66 in which the die parts 62 and 63 are received. The die holder is completed by an element 67 hinged to the base 64 by a pintle 68 and having a semi-cylindrical recess 69 complementary to the recess 66 so as to form a complete cylindrical recess into which the die elements 62 and 63 are mounted. The element 67 may be secured to the base 64 by a link 70 which engages a projection 71 on the element 67 opposite the pintle 68 and is engaged at its lower end by a pin 72 on a rocking lever 73 which is hinged to the base 64 at 74.

It will be apparent that when the lever 73 is swung upwardly the link 70 is lifted free of the projection 71 and may be swung outwardly and the element 67 swung on the pintle 68 free of the base 64 to enable the die elements to be removed. When the element 67 is swung to closed position the link 70 may be engaged on the projection 71 and on moving the lever 73 downwardly the link pulls the closing element 67 against the base with a toggle action.

It will be apparent that the dimensions of the tube on the line of splice will be determined by the dimensions of the dies 12 and 13 which are predetermined and unchangeable. Consequently a uniform splice and a tube of uniform dimensions may be obtained regardless of the extent of belling or widening of the tube stock. Also, inasmuch as the dimensions of the stock undergoing splicing is fixed, the splice may be securely and uniformly accomplished.

What I claim is:

1. Apparatus for splicing the ends of inner tubes which comprises a hollow die holder having a stepped cylindrical recess and a cylindrical die having a hinged section, said die being rotatably mounted co-axially in the recess of said holder, the circumferential wall of said die holder being open to permit said hinged section to swing outwardly.

2. The apparatus of claim 1 in which said die has its inner edge undercut.

3. Apparatus for splicing the ends of inner tubes which comprises a pair of arms pivoted to swing toward and from each other, a pair of hollow die holders one on each of said arms in opposed relation, each said die holder having a stepped cylindrical recess and having an open space in the side wall of said recess and a cylindrical die having a hinged section to swing outwardly through said open space of said die holder and being rotatably mounted co-axially in the recess of said holder.

4. Apparatus for splicing the ends of inner tubes which comprises a pair of arms pivoted to swing toward and from each other, a pair of hollow die holders one on each of said arms in opposed relation, each said hollow die holder having a stepped cylindrical recess and having an open space in the side wall of said recess, a cylindrical die having a hinged section to swing outwardly through said open space of said holder and being rotatably mounted co-axially in the recess of its respective holder, and means to swing said arms to bring said dies into abutment.

5. The apparatus of claim 4 having means to retard the movement of said arms as they approach a position of abutment.

6. The apparatus of claim 4 in which said means to swing said arms comprises a fluid actuated means.

7. The apparatus of claim 4 having a heating element and means to swing said heating element into position between said dies as they are brought toward abutment.

8. Apparatus for splicing the ends of inner tubes which comprises a pair of arms pivoted to swing toward and from each other, a pair of hollow die holders one for each of said arms having a stepped cylindrical recess, the side wall of said recess of each holder having an open space, a pair of cylindrical dies one for each die holder having a hinged section to swing through the open space of its respective die holder and being rotatably mounted co-axially in the recess of its respective holder, a fluid operated actuating means to swing said arms, a fluid check device and a lever actuated by said fluid actuating means to engage said check device as said arms swing to bring said die holders and dies to abutment.

9. The apparatus of claim 8 having a heater element and means to move said heater element into position between said dies.

CUYLER S. McCHESNEY.

REFERENCES CITED

The following references are of record in the file of this patent:

UNITED STATES PATENTS

| Number | Name | Date |
|---|---|---|
| 1,687,811 | Warner | Oct. 16, 1928 |
| 1,693,636 | Coe | Dec. 4, 1928 |
| 1,719,206 | Young | July 2, 1929 |
| 1,761,754 | Shook | June 3, 1930 |
| 1,802,491 | Young et al. | Apr. 28, 1931 |
| 1,921,623 | Leguillon | Aug. 8, 1933 |